United States Patent
Oshima

(10) Patent No.: US 6,453,123 B1
(45) Date of Patent: Sep. 17, 2002

(54) CONTROL SYSTEM OF ZOOM LENS FOR DIGITAL STILL CAMERAS

(75) Inventor: Shigeru Oshima, Chofu (JP)

(73) Assignee: Arc Design, Inc., Tokyo (JP)

( * ) Notice: Subject to any disclaimer, the term of this patent is extended or adjusted under 35 U.S.C. 154(b) by 0 days.

(21) Appl. No.: 09/904,404

(22) Filed: Jul. 12, 2001

(30) Foreign Application Priority Data

Jun. 29, 2001 (TW) .......................................... 90115977

(51) Int. Cl.$^7$ .............................. G03B 5/00; G02B 15/14
(52) U.S. Cl. ........................ 396/79; 348/357; 348/358; 359/696
(58) Field of Search ................................. 348/345, 340, 348/347, 357, 358; 396/79–83; 359/696, 697, 698

(56) References Cited

U.S. PATENT DOCUMENTS 5,298,933 A * 3/1994 Chigira ........................ 396/82

* cited by examiner

*Primary Examiner*—W. B. Perkey

(57) ABSTRACT

A system to be used in a digital still camera to control zooming of the zoom lens, which uses programmed data written in a micro controller unit (MCU) instead of cams that are usually used to mechanically control zooming of the zoom lens of digital still cameras, and to control auto-focusing of the zoom lens with the very mechanism which is used for the zoom controlling by receiving electronic signals (pulses) from the MCU or electronically controlled distance measuring system of the digital still camera.

8 Claims, 5 Drawing Sheets

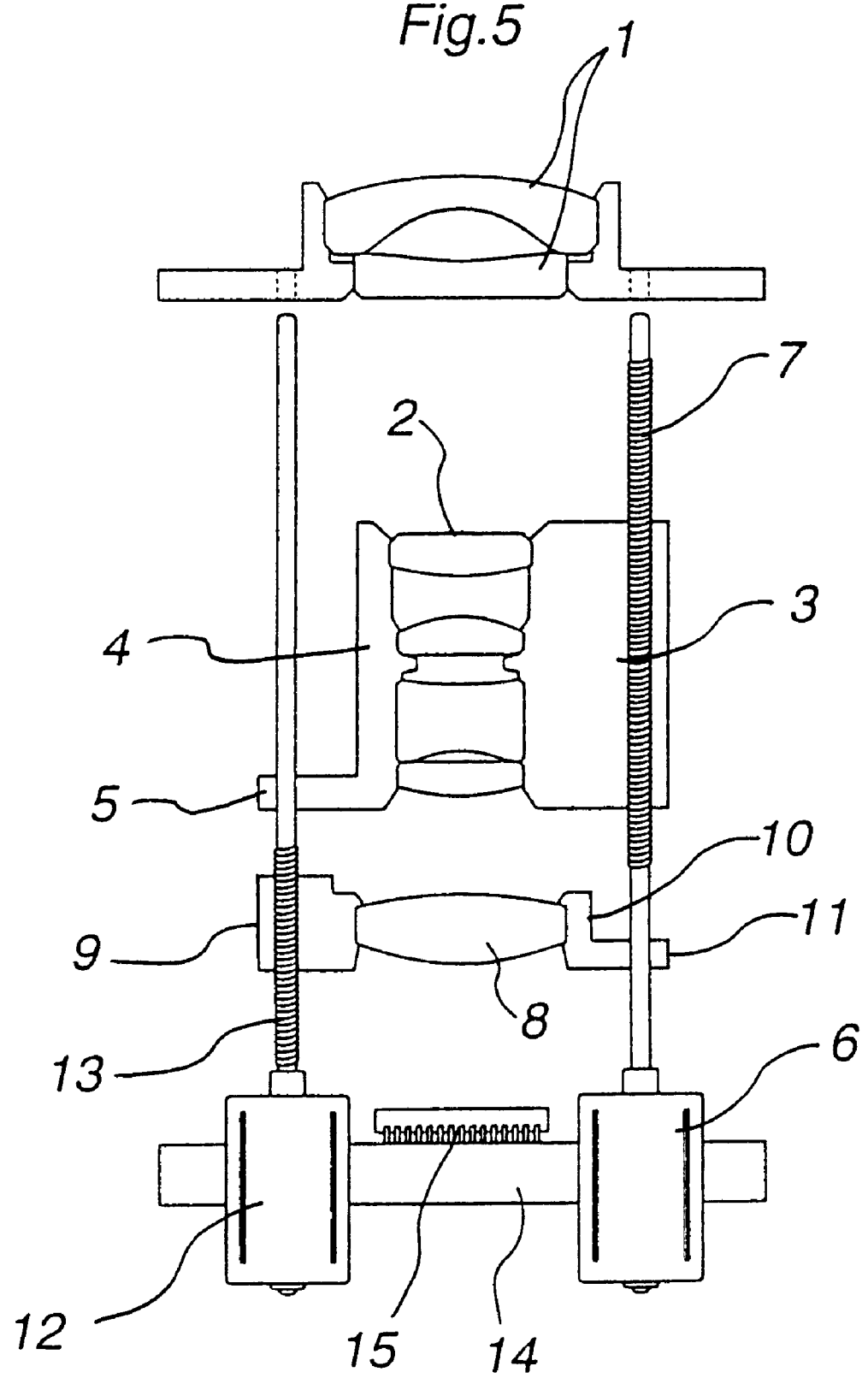

CONTROL SYSTEM OF ZOOM LENS FOR DIGITAL STILL CAMERAS

BACKGROUND OF THE INVENTION

1. Field of the Invention

The invention relates to the system to control zooming of the lens for digital still cameras receiving electronic signals (pulses) from micro controller unit (MCU), in which the program of zoom lens movement based on the lens design data is written, and also to control auto-focusing of the zoom lens using the very mechanism which drives the zooming of the lens receiving electronic signals (pulses) from the MCU or electronically controlled distance measuring system of the digital still camera.

2. Background art

In the case of digital still cameras, the zoom lens is usually to have the front (headmost) lens element or the first group of lenses fixed at the headmost position of the zoom lens assembly not to move. And the second group and the third group of the lenses move at a time to get the whole lens to work as a zoom lens. The movements of the second and third groups of the lenses change the focal length in straight succession working as a zoom lens. From wide angle (shortest focal length of the lens) to telephoto (longest focal length of the lens), the two groups of the lenses must be moved correspondingly each other. From one focal length position to another focal length position the moving strokes of two groups of lenses are determined by the design of the lens. Usually the moving strokes of these two groups of the lenses are controlled by cams mechanically, which are groove cams in most cases.

FIG. 1 shows a typical design of zoom lens with 2x (two times) zooming ratio for digital still cameras. As shown there the first group of lenses (1) is fixed at the front (headmost) position and does not move. The second group of lenses (2) and the third group of lenses (3) move back and forth according to the change of the focal length, and the lines (4, 5) show the movements (tracks) of these two groups. The straight line (4) shows the movement (track) of the second group of lenses (2), and the curved line (5) shows the movement (track) of the third group of lenses (3). Each group moves at a time correspondingly each other following the predetermined tracks from one focal length -point to another. In FIG. 1, five focal length points are shown as examples of zooming positions. The position #1 shows the positions of the two groups of lenses at the focal length of 11.0 mm (the longest, telephoto position), #2 at the focal length of 9.615 mm, #3 at the focal length of 8.319 mm, #4 at the focal length of 6.913 mm and #5 at the focal length of 5.505 mm (the shortest, wide angle position).

To get the two groups of lenses to carry out the correspondent movements effectively, usually a mechanism with groove cams is used. FIG. 2 and FIG. 2-a show the conventional and mechanical controlling system of zoom lens, which has six groove cams. One group of the lenses is controlled by three groove cams of same curve and dimensions as a set provided on the periphery of the outermost lens barrel (a tube to hold the whole lens assembly), and another set of three groove cams of same curve and dimensions provided on the same periphery of the lens barrel controls the other group of the lenses.

The first set of the groove cams (6) provided on the outermost lens barrel (7) controls the second group of the lenses (2), and the second set of the groove cams (8) provided on the outermost lens barrel (7) controls the third group of the lenses (3). At the bottom rim of the outermost lens barrel (7) the gear teeth (9) are provided, which are engaged with the driving gears (10) of the stepping motor (11). When the zooming switch is turned on, the stepping motor (11) starts rotating, and then the outermost lens barrel (7) starts rotating. While the outermost lens barrel (7) is rotating, the groove cams (6, 8) move, too, and the two groups of the lenses (2, 3) are also moving back and forth (up and down) by the movements of the pins (12) fixed on the lens barrel of each lens group and inserted into the slots of the groove cams, which move according to the curves of the groove cams (6, 8). The curves of the groove cams (6, 8) are to be designed according to the design data of the zoom lens accurately, namely according to the tracks like the tracks (4, 5) shown in FIG. 1. The direction of lens movement (back or forth) is determined by the direction of stepping motor rotation.

In this kind of mechanical controlling of zooming, the accuracy of the groove cams are highly required and it is very difficult to manufacture lens barrels with such accurate groove cams, and consequently the cost of such accurate parts and components is quite expensive. The assembling and adjustment of the lens with such controlling mechanism are also quite difficult.

Further more, to focus the lens automatically, so-called auto-focusing, it is usually necessary to adjust the position of one of the lens groups regardless of the lens zooming mechanism. Receiving signals from auto-focusing systems of the MCU or electronic distance measuring system of the digital still camera, one of the lens groups must move back and forth very slightly. However, in the case of theretofore-explained mechanical cam type zooming system, it is physically impossible because all the moving lens groups are connected to the zooming cam mechanism. If one of the lens group starts moving, other lens group starts moving too, and it is impossible for one of the groups alone to move separately from the zooming system. So in the case of mechanical cam zooming system of digital still cameras, usually the image sensor like CCD or C-MOS moves to adjust the lens focus instead of driving any of lens groups or lens element.

However, it is also extremely difficult to move the whole image sensor, which is connected to the print-circuit board (PCB), and it means that the image sensor must be moved together with a part of the PCB or with connecting wires.

The lens focusing of the digital still cameras must be adjusted with very small scale unit of a hundredth of millimeter, and if the focusing is adjusted by moving the image sensor, the horizontality of the image sensor against the lens must be also extremely high and the image sensor must be kept perfectly even with the lens. This kind of lens focusing method is also very difficult to carry out in comparison with the method of moving the lens element or one of the lens groups, which are held in lens barrels (tubes) and can move smoothly and easily back and forth (up and down). FIG. 3 shows the mechanism of focusing by moving the image sensor. The image sensor (13) is placed just behind of the rearmost lens, and the image sensor is fixed on the base (14). The threaded bearing (15) is formed as a part of the image sensor base (13). The stepping motor (16) is provided to drive the auto-focusing mechanism, and the stepping motor has the screw rod (17) as an extension of the motor shaft. The screw rod is engaged with the female-screw-thread provided inner wall of the threaded bearing (15).

When the auto-focusing system switch is turned on, the stepping motor (16) rotates and the screw rod (17) rotates and the threaded bearing (15) moves back and forth (up and down). Thus the image sensor (13) moves back and forth (up and down) regardless of the movement of lens zooming.

The accuracy required for such movement of image sensor and adjustment of lens focus by such a delicate method is very high, and even if it is possible, it must be quite expensive.

To eliminate theretofore explained difficulties of controlling of lens zooming by cams mechanically and of adjusting lens focus by moving the image sensor, it is preferable to have a much simpler system with much less and inexpensive parts and components, and with much easier way of assembling.

SUMMERY OF THE INVENTION

In this invention the groove cams, which are used in conventional mechanism of zooming control, are eliminated, and instead of the cams the two lens groups are controlled by two stepping motors, and one stepping motor drives the first group of lenses and the other stepping motor drives the second group of lenses. The threaded bearing is formed as a part of lens barrel of each moving lens group on the side of the barrel. The stepping motor has a screw rod as an extension of the motor shaft, and the screw rod is engaged with the female-screw-thread provided inner wall of the threaded bearing. The screw rod supports the lens barrel together with some sort of position-stabilizing means to stop rotation of the lens barrel itself.

When the stepping motors start rotating simultaneously, both of the screw rods start rotating and by the rotation of the rods, the threaded bearings are driven on the male-thread of screw rods, and the two lens groups start moving back and forth (up and down) depending on the direction of the motor rotation as the threaded bearings move back and forth (up and down).

In the case of this invention, instead of groove cams to control zooming of the lens mechanically, the lens moving data to control each group of lenses for each focal length position, namely the data of the lens group moving tracks like the tracks (4, 5) shown in FIG. 1 must be programmed as electronic position signal data and written in the MCU (micro controller unit) of the digital still camera. The instant that the power zooming switch of either telephoto or wide angle is turned on, the stepping motors start moving simultaneously and the lens groups start moving to control zooming of the total lens in telephoto direction or wide-angle direction receiving signals from the MCU according to the designed lens moving tracks.

While either of the telephoto or wide-angle switches is on, the MCU keeps sending signals to each stepping motor to move the lens groups from a point to another, and when the switch is turned off, the lens moving stops instantly there. The position where the lens stopped is to be remembered by the MCU, and when either of the telephoto switch or wide-angle switch is turned on next time, the lens zooming starts from the focal length position where the lens stopped last time.

At the same time, there is no cam at all, which disables the lens focusing separately from the lens zooming mechanism. But instead a part of the zooming mechanism, namely one of the stepping motors can be used for driving one of the moving lens groups. By moving either one of the moving lens groups, the second group of lenses or the third group of lenses, the lens focusing can be adjusted. After or before zooming being controlled, the MCU will send a signal where the lens group, either one of two, should be placed to adjust the focus, and the stepping motor starts moving and moves the lens group to proper position.

Thus by using two stepping motors eliminating mechanical groove cams which require extreme accuracy in manufacturing, the zooming can be controlled quite easily only by electronic signals which are pre-programmed and written in the camera MCU, and further more the auto-focusing can be adjusted by one of the two stepping motors moving one of the lens groups and eliminating the very difficult method of lens focusing of moving image sensor.

BRIEF DESCRIPTION OF DRAWINGS

FIG. 2-a is a perspective view of the two lens groups assembled in each lens barrel, which are placed in the conventional zooming control system with cams shown by FIG. 2.

FIG. 5 is a part cross sectional view of an example of the control system of zoom lens for digital still cameras of this invention.

DETAILED DESCRIPTION OF THE INVENTION

Figure 4:
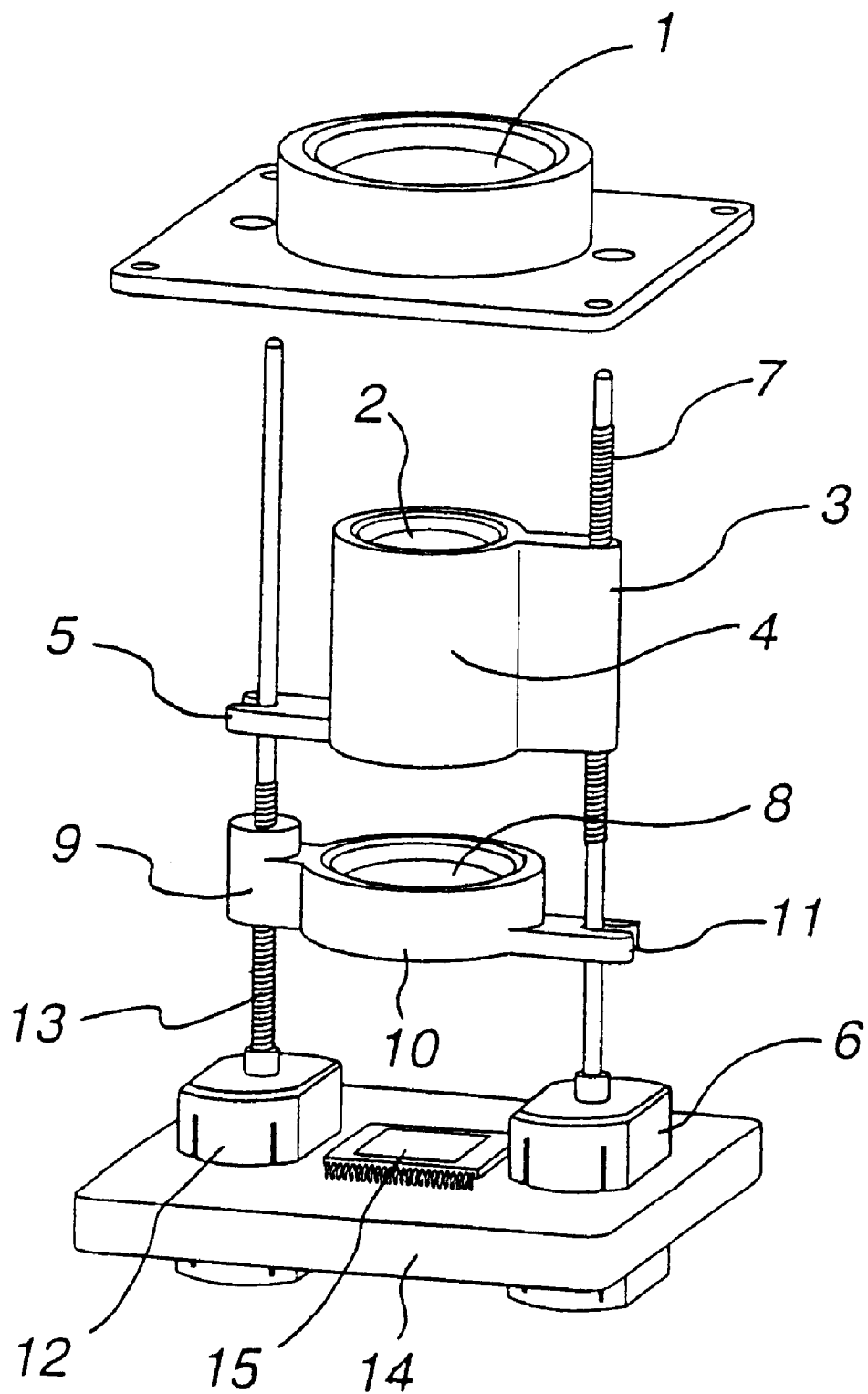
FIG. 4 is a perspective view of an example of the control system of zoom lens for digital still cameras of this invention.

FIG. 4 and FIG. 5 show an example of this invention, namely the control system of zoom lens for digital still cameras which comprises a front (first) group of lenses (1) (or first element) fixed at the headmost position of the zoom lens assembly, a group of lenses (2) which is placed next to the first group of lenses (1) (hereinafter referred to as the second group of lenses), a threaded bearing (3) (hereinafter referred to as the first threaded bearing) formed as a part of the lens barrel (4) of (hereinafter referred to as the second lens barrel) the second group of lenses (2), a position stabilizing fork (5) (hereinafter referred to as the first position stabilizing fork) which is formed on the opposite side of the second lens barrel (4) of the second group of lenses (2) from the first threaded bearing (3), a stepping motor (6) (hereinafter referred to as the first stepping motor) s with a screw rod (7) (hereinafter referred to as the first screw rod) provided as an extension of the motor shaft, which is screwed into the bearing hole of the first threaded bearing (3) of the second group of lenses (2) and engaged with the threads provided on the inner wall of the bearing hole of the first threaded bearing (3), a group of lenses (8) which is placed next to the second group of lenses (2) (hereinafter referred to as the third group of lenses), a threaded bearing (9) (hereinafter referred to as the second threaded bearing) formed as a part of the lens barrel (10) (hereinafter referred to as the third lens barrel) of the third group of lenses (8), a position stabilizing fork (11) (hereinafter referred to as the second position stabilizing fork) which is formed on the opposite side of the third lens barrel (10) of the third group of lenses (8) from the second threaded bearing (9), and a stepping motor (12) (hereinafter referred to as the second stepping motor) with a screw rod (13) (hereinafter referred to as the second screw rod) provided as an extension of the motor shaft, which is screwed into the bearing hole of the second threaded bearing (9) of the third group of lenses (8) and engaged with the threads provided on the inner wall of the bearing hole of the second threaded bearing (9). All these component parts are assembled on the assembly base (14) on which the image sensor (15) like CCD or C-MOS is placed just underneath of the rearmost element of the lens assembly.

The second group of lenses (2) is assembled in the second lens barrel (4), and the second lens barrel (4) is supported by the first screw rod (7) extended from the shaft of the first stepping motor (6) which is screwed into the hole of first threaded bearing (3) formed as a part of the second lens barrel (4) and engaged with the inner threads of the first threaded bearing (3). The second lens barrel (4) is also supported by the first position stabilizing fork (5), which is provided as a position stabilizing means of the second lens barrel (4), is formed on the opposite side of the second lens barrel (4) from the first threaded bearing (3) and is placed over the second screw rod (13) extended from the shaft of the second stepping motor (12) keeping the second screw rod (13) between the ends (slot) of the first position stabilizing fork (5) so that the second lens barrel may not rotate.

The second lens barrel (4) can be moved back and forth (up and down) along the rotating first screw rod (7) and the second screw rod (13).

The third group of lenses (8) is assembled in the third lens barrel (10), and the third lens barrel (10) is supported by the second screw rod (13) extended from the shaft of the second stepping motor (12) which is screwed into the hole of second threaded bearing (9) formed as a part of the third lens barrel (10) and engaged with the inner threads of the second threaded bearing (9). The third lens barrel (10) is also supported by the second position stabilizing fork (11), which is provided as a position stabilizing means of the third lens barrel (10), is formed on the opposite side of the third lens barrel (10) from the second threaded bearing (9) and is placed over the first screw rod (7) extended from the shaft of the first stepping motor (6) keeping the first screw rod (7) between the ends (slot) of the second position stabilizing fork (11) so that the third lens barrel may not rotate.

The third lens barrel (10) can be moved back and forth (up and down) along the rotating second screw rod (13) and the first screw rod (7).

Figure 1:
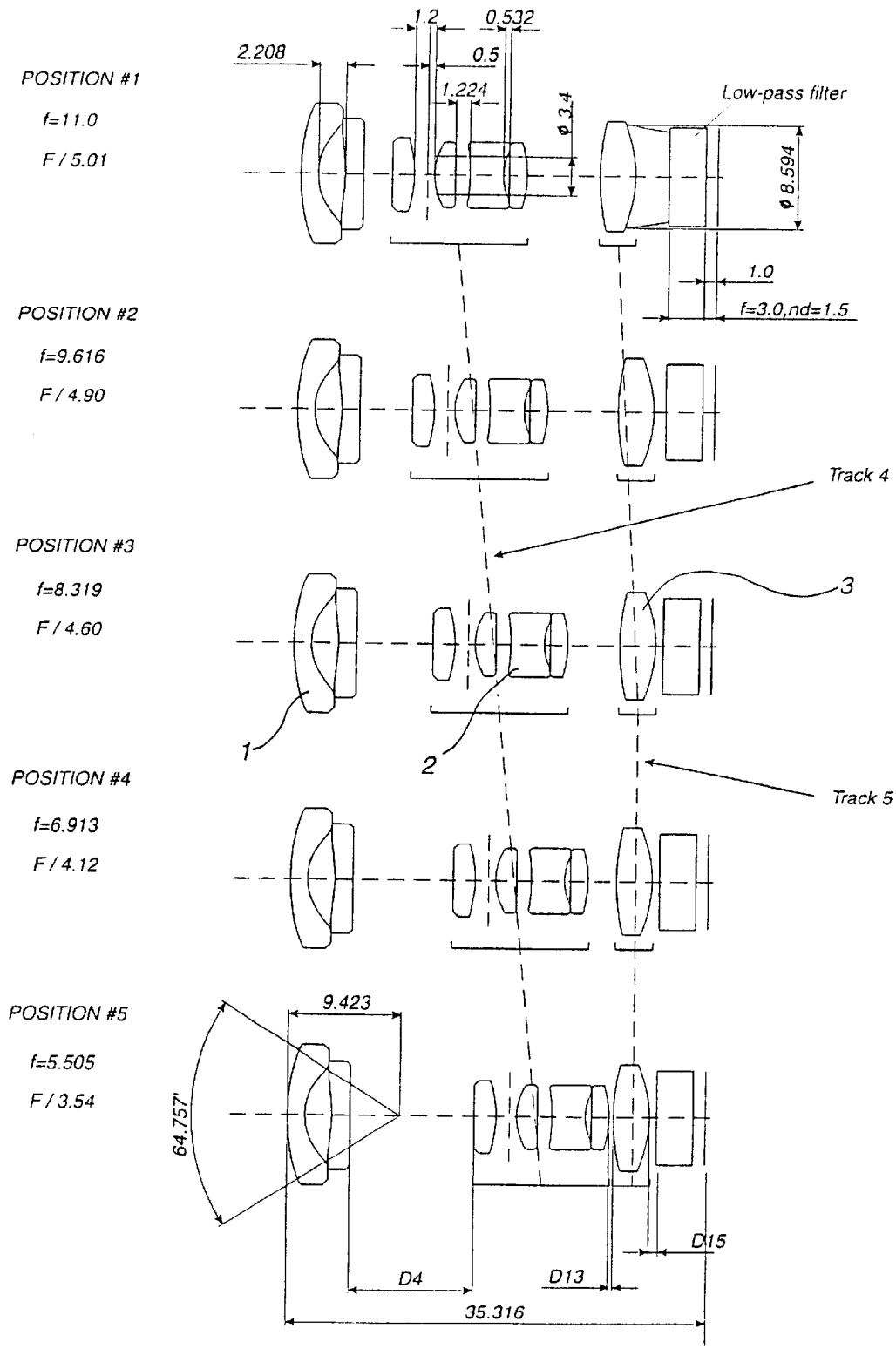
FIG. 1 is a drawing of typical design of a zoom lens for digital still camera, which shows the moving tracks of the second and the third lens groups.
Figure 2:
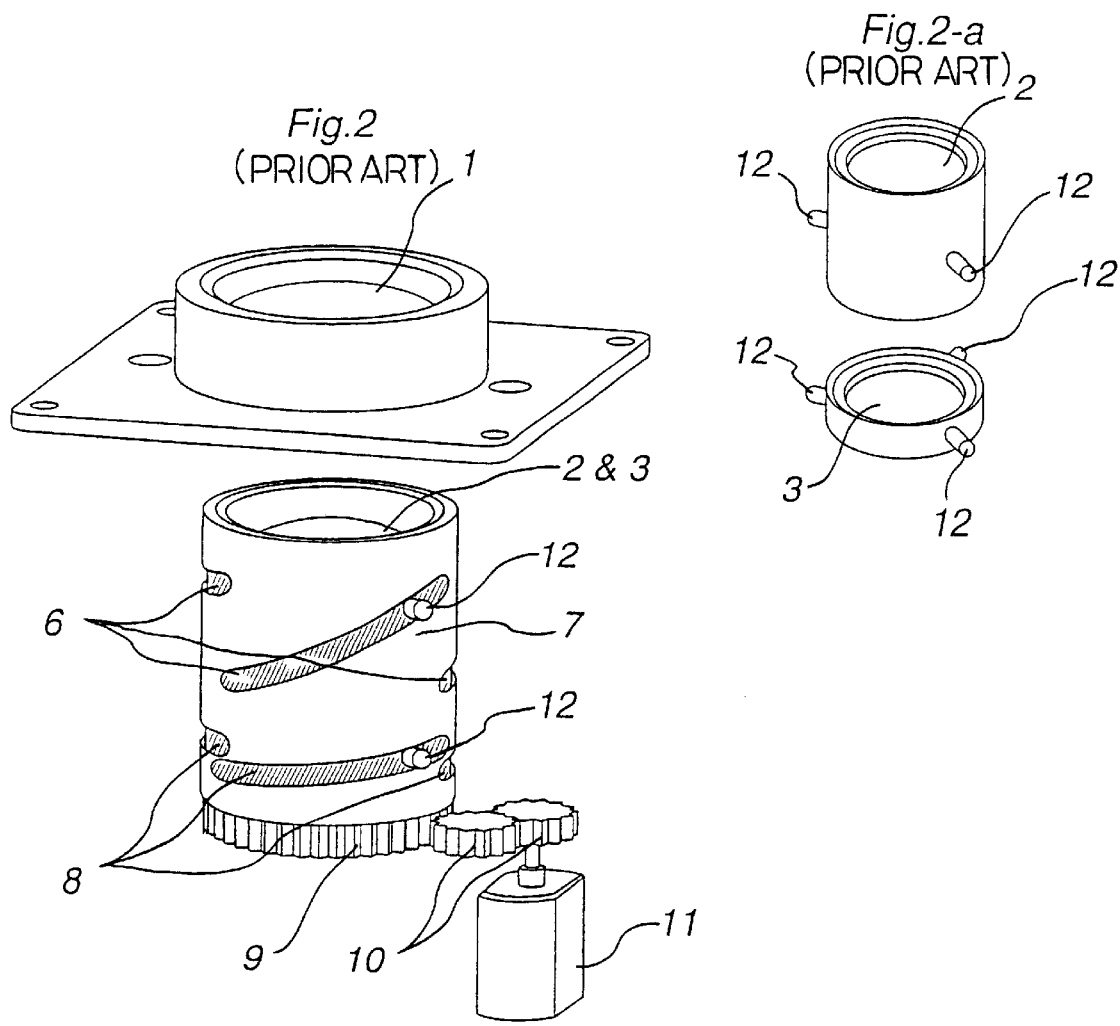
FIG. 2 is a perspective view of the conventional zooming control system by cams.
Figure 3:
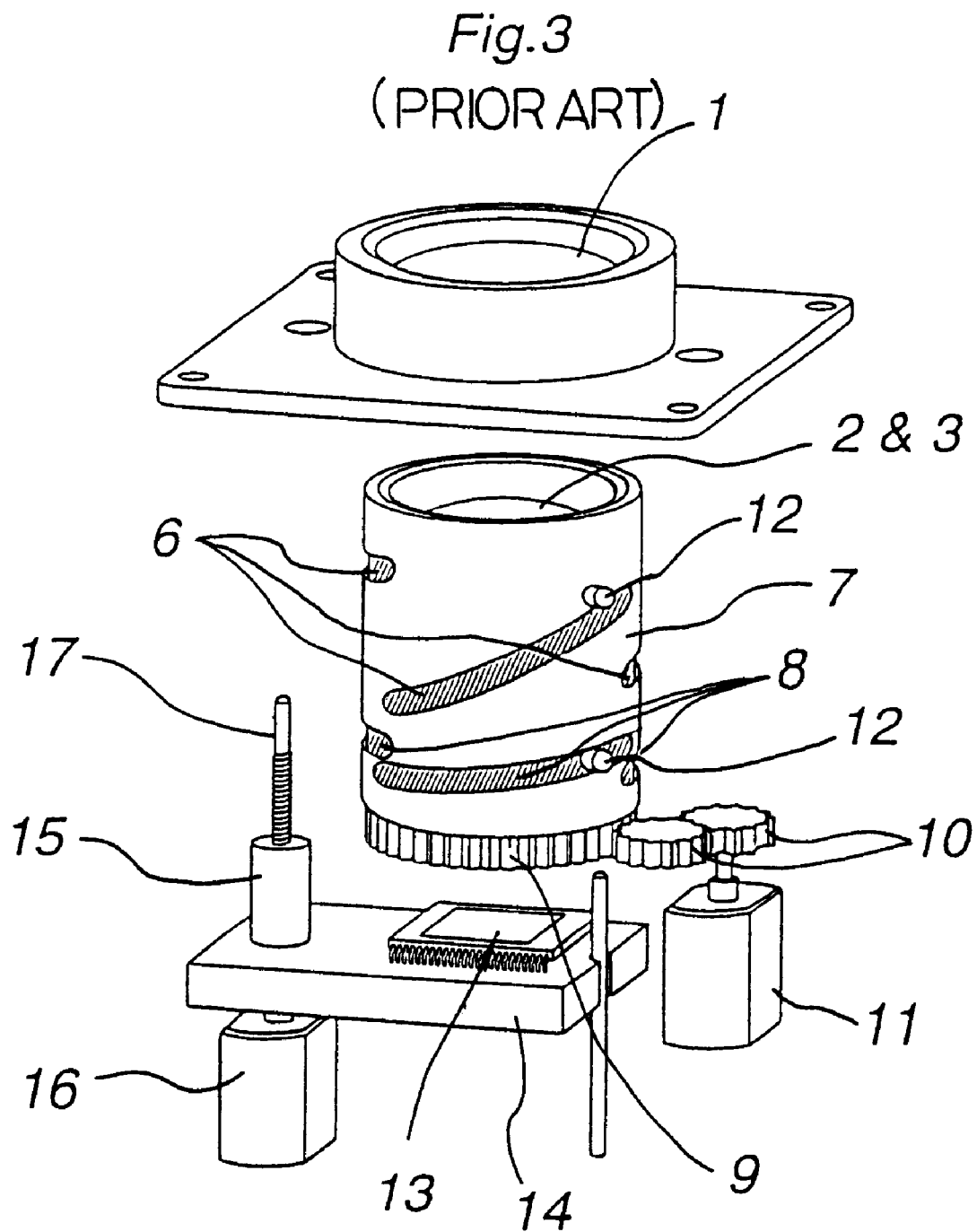
FIG. 3 is a perspective view of the conventional zooming control system with cams and the auto-focusing mechanism to move the image sensor for focus adjustment.

The instant that the power zooming switch of either telephoto or wide angle is turned on, the stepping motors (6, 12) start moving simultaneously and the lens groups (2, 8) start moving to control zooming of the total lens in telephoto direction or wide-angle direction receiving the zooming position signals of the zoom lens, which are to be programmed beforehand and written in the MCU of the digital still camera as the lens moving data to control each group of lenses for each focal length position, namely the data of the lens group moving tracks like the tracks (4, 5) shown in FIG. 1.

While either of the telephoto switch or wide-angle switch is on, the MCU keeps sending signals to each stepping motor (6, 12) to move the lens groups from a point to another, and when the switch is turned off, the movements of the both lens groups stop instantly there. The positions where the both lens groups (2, 8) stopped is to be remembered by the MCU, and when either of the telephoto switch or wide-angle switch is turned on next time, the lens zooming starts from the focal length position where the lens groups stopped last time.

As shown in FIGS. 4 and 5, the whole assembly is built on the assembly base (14), and the image sensor (15) is placed and fixed just behind (underneath) of the rearmost element of the zoom lens, and in this invention, it is not necessary for focusing to move the image sensor (15) at all. By rotating one of the two stepping motors (6, 12) alone, one of the two lens groups (2, 8) can be moved back and forth delicately, and by moving one of the two lens groups (2, 8) alone, the whole zoom lens can be focused properly on the image sensor (15). So when the auto-focusing signals are sent from the MCU of the digital camera to focus the lens properly using the through-the-lens auto-focusing system, the one of the lens barrels (4, 10) starts moving alone and stops when the image obtained on the image sensor (15) comes sharply in focus. Thus in this invention without using any control mechanism depending on the image sensor movement, one of the very stepping motors (6, 12) used for zooming control can move one of the lens groups (2, 8) to focus the whole zoom lens automatically receiving auto-focusing signals from the camera MCU, but independently from the zooming control mechanism.

As theretofore explained, in this invention the groove cams for zooming control that require very high accuracy to manufacture are not used, and also very difficult mechanism of image sensor moving of lens focusing is not used. Instead in this invention, only two stepping motors (6, 12) control the zooming and further more one of the very two stepping motors (6, 12) can be used for auto-focusing. Thus the whole system and mechanism of this invention are much simpler, inexpensive and easy to assemble.

What is claimed is:

1. A control system of zoom lens for digital still cameras which controls zooming of the zoom lens using programmed data written in the micro controller unit (MCU) of digital still cameras and at the same time controls auto-focusing of the zoom lens with the very mechanism which is used for the zoom controlling by receiving electronic signals (pulses) from the MCU or electronically controlled distance measuring system of the digital still camera comprising:

(a) an assembly base on which said control system of zoom lens for digital still cameras is assembled;

(b) a front (first) group of lenses, which is assembled in a lens barrel and placed at the headmost position of said zoom lens assembly;

(c) a group of lenses as the second group of lenses, which is assembled in a lens barrel as the second barrel and placed next to said first group of lenses;

(d) a threaded bearing as the first threaded bearing which is formed as a part of said second lens barrel of said second group of lenses;

(e) a means of position stabilizing as the first means of position stabilizing for said second lens barrel not to rotate;

(f) a stepping motor as the first stepping motor to drive said second lens barrel;

(g) a screw rod as the first screw rod which is provided on and connected to the shaft of said first stepping motor as an extension of the motor shaft and is screwed into the bearing hole of said first threaded bearing of said second lens barrel of said second group of lenses and engaged with the threads provided on the inner wall of said first threaded bearing of said second lens barrel of said second group of lenses;

(h) a group of lenses as the third group of lenses, which is assembled in a lens barrel as the third lens, barrel and placed next to said second group of lenses;

(i) a threaded bearing as the second threaded bearing which is formed as a part of said third lens barrel of said third group of lenses;

(j) means of position stabilizing as the second means of position stabilizing for said third lens barrel not to rotate;

(k) a stepping motor as the second stepping motor to drive said third lens barrel; and (l) a screw rod as the second screw rod which is provided on and connected to the shaft of said second stepping motor as an extension of the motor shaft and is screwed into the bearing hole of said second threaded bearing of said third lens barrel of said third group of lenses and engaged with the threads provided on the inner wall of said second threaded bearing of said third lens barrel of said third group of lenses.

2. A control system of zoom lens for digital still cameras as claimed in claim 1, wherein while said second lens barrel is moving back and forth, said second lens barrel is supported and stabilized by said first screw rod engaged with said first threaded bearing and said first position stabilizing means for the second lens barrel not to rotate getting said second lens barrel to move smoothly without any harmful rotation.

3. A control system of zoom lens for digital still cameras as claimed in claim 1, wherein while said third lens barrel is moving back and forth, said third lens barrel is supported and stabilized by said second screw rod engaged with said second threaded bearing and said second position stabilizing means for said third lens barrel not to rotate getting said third lens barrel to move smoothly without any harmful rotation.

4. A control system of zoom lens for digital still cameras as claimed in claim 1, wherein said second lens barrel in which said second group of lenses are assembled is connected to said first screw rod of said first stepping motor through said first thread bearing so that said second barrel moves back and forth (up and down) when said first stepping motor is rotating receiving the data-signals of zooming of the zoom lens, which is pre-programmed and written in the micro controller unit (MCU) of the digital still camera.

5. A control system of zoom lens for digital still cameras as claimed in claim 1, wherein said third lens barrel in which said third group of lenses are assembled is connected to said second screw rod of said second stepping motor through said second thread bearing so that said third barrel moves back and forth (up and down) when said second stepping motor is rotating receiving the data-signals of zooming of the zoom lens, which is pre-programmed and written in the micro controller unit (MCU) of the digital still cameras.

6. A control system of zoom lens for digital still cameras as claimed in claim 1, wherein when one of said first and second stepping motors starts rotating, exactly at the same time or strictly simultaneously the other stepping motor is to start rotating so that said second and third lens groups start moving simultaneously according to the zoom lens movement data received from the MCU of the digital still camera to get said all lens groups as a whole to work as a complete zooming lens.

7. A control system of zoom lens for digital still cameras as claimed in claim 1, wherein when said first stepping motor receives signals of auto-focusing from the MCU of the digital still camera, said first stepping motor alone starts moving and the rotation of said first stepping motor moves said second lens barrel back and forth until the whole zoom lens is properly in focus, and stops when said first stepping motor receives a signal to stop from the MCU.

8. A control system of zoom lens for digital still cameras as claimed in claim 1, wherein when said second stepping motor alone receives signals of auto-focusing from the MCU of the digital still camera, said second stepping motor alone starts moving and the rotation of said second stepping motor gets said third lens barrel to move back and forth until the whole zoom lens is properly in focus, and stops when said second stepping motor receives a signal to stop from the MCU.

\* \* \* \* \*